(12) United States Patent
Shi et al.

(10) Patent No.: US 11,733,715 B2
(45) Date of Patent: Aug. 22, 2023

(54) AIRFLOW SENSING BASED ADAPTIVE NONLINEAR FLIGHT CONTROL OF A FLYING CAR OR FIXED-WING VTOL

(71) Applicant: California Institute of Technology, Pasadena, CA (US)

(72) Inventors: Xichen Shi, Sunnyvale, CA (US); Patrick Spieler, Pasadena, CA (US); Ellande Tang, Pasadena, CA (US); Elena S. Lupu, Pasadena, CA (US); Soon-Jo Chung, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 279 days.

(21) Appl. No.: 17/066,183

(22) Filed: Oct. 8, 2020

(65) Prior Publication Data
US 2021/0103298 A1    Apr. 8, 2021

Related U.S. Application Data

(60) Provisional application No. 62/912,150, filed on Oct. 8, 2019.

(51) Int. Cl.
*G05D 1/10* (2006.01)
*B64C 29/00* (2006.01)
(Continued)

(52) U.S. Cl.
CPC ............ *G05D 1/102* (2013.01); *B64C 9/00* (2013.01); *B64C 13/16* (2013.01); *B64C 29/00* (2013.01); *G01P 5/001* (2013.01); *G05D 1/0858* (2013.01)

(58) Field of Classification Search
CPC ...... G05D 1/102; G05D 1/0858; G05D 1/101; B64C 9/00; B64C 13/16; B64C 29/00;
(Continued)

(56) References Cited

U.S. PATENT DOCUMENTS 3,666,209 A * 5/1972 Taylor ................. B64C 29/0033
244/12.4
4,764,671 A * 8/1988 Park .................... G01F 23/2922
250/577

(Continued)

FOREIGN PATENT DOCUMENTS

KR    20170135577 A    12/2017
WO    2021072089 A1    4/2021

OTHER PUBLICATIONS

International Search Report and Written Opinion for International Application No. PCT/US2020/054802, Search completed Jan. 21, 2021, dated Jan. 27, 2021, 8 Pgs.
(Continued)

*Primary Examiner* — Donald J Wallace
*Assistant Examiner* — Jalal C Coduroglu
(74) *Attorney, Agent, or Firm* — KPPB LLP

(57) ABSTRACT

A fixed-wing vertical take-off and landing (VTOL) vehicle configured with a composite adaptive nonlinear tracking controller that utilizes a real-time accurate estimation of the complex aerodynamic forces surrounding the wing(s) and rotors in order to achieve a high performance flight. The method employs online adaptation of force models, and generates accurate estimation for wing and rotor forces in real-time based on information from a three-dimensional airflow sensor. The novel three-dimensional airflow sensor illustrates improved velocity tracking and force prediction during the transition stage from hover to forward flight.

20 Claims, 12 Drawing Sheets

(51) Int. Cl.
G05D 1/08 (2006.01)
B64C 13/16 (2006.01)
G01P 5/00 (2006.01)
B64C 9/00 (2006.01)

(58) Field of Classification Search
CPC ............ B64C 2201/14; B64C 29/0025; B64C 2201/021; B64C 2201/104; B64C 2201/108; B64C 39/024; G01P 5/001; G01P 5/14
See application file for complete search history.

(56) References Cited

U.S. PATENT DOCUMENTS

| | | | | |
|---|---|---|---|---|
| 5,054,716 | A * | 10/1991 | Wilson | B64D 35/00 244/66 |
| 5,094,412 | A * | 3/1992 | Narramore | B64C 9/04 244/214 |
| 6,012,331 | A * | 1/2000 | Menzies | G01P 13/025 73/180 |
| 6,607,161 | B1 * | 8/2003 | Krysinski | B64C 29/0033 244/7 C |
| 2007/0010902 | A1 * | 1/2007 | Calise | G05D 1/0825 700/51 |
| 2007/0102568 | A1 * | 5/2007 | Higgins | F42B 10/143 244/3.25 |
| 2016/0114887 | A1 | 4/2016 | Zhou et al. | |
| 2017/0248453 | A1 * | 8/2017 | Herlitzius | A01D 41/1272 |
| 2017/0349266 | A1 | 12/2017 | Krebs et al. | |
| 2018/0240004 | A1 * | 8/2018 | Gasser | E04B 1/7633 |
| 2019/0106206 | A1 * | 4/2019 | Shi | B64C 11/001 |
| 2019/0242924 | A1 * | 8/2019 | Lang | B64F 5/60 |
| 2019/0265732 | A1 * | 8/2019 | Arwatz | G05D 1/0808 |
| 2020/0033851 | A1 * | 1/2020 | Hajimiri | B64C 37/02 |
| 2020/0150690 | A1 * | 5/2020 | Gálffy | G05D 1/0808 |

OTHER PUBLICATIONS

"Preliminary Datasheet SDP33: Digital Differential Pressure Sensor", Sensirion, Version 0.1, Aug. 2017, 14 pgs.
Bulka et al., "A Universal Controller for Unmanned Aerial Vehicles", Proceedings of the IEEE/RSJ International Conference on Intelligent Robots and Systems (IROS), Madrid, Spain, Oct. 1-5, 2018, pp. 4171-4176.
Calise et al., "Nonlinear adaptive flight control using neural networks", IEEE Control Systems Magazine, vol. 18, No. 6, Dec. 1998, pp. 14-25.
Chowdhury et al., "Back-stepping control strategy for stabilization of a tilt-rotor uav", 24th Chinese Control and Decision Conference, May 23-25, 2012, pp. 3475-3480, doi: 10.1109/CCDC.2012.6244555.
Faessler et al., "Differential Flatness of Quadrotor Dynamics Subject to Rotor Drag for Accurate Tracking of High-Speed Trajectories", IEEE Robotics and Automation Letters, vol. 3, No. 2, Apr. 2018, pp. 620-626.
Farrell et al., "Backstepping-Based Flight Control with Adaptive Function Approximation", Journal of Guidance, Control, and Dynamics, vol. 28, No. 6, Nov. 2005, pp. 1089-1102.
Frank et al., "Hover, transition, and level flight control design for a single-propeller indoor airplane", AIAA Guidance, Navigation and Control Conference and Exhibit, Aug. 20-23, 2007, 18 pgs., doi: https://doi.org/10.2514/6.2007-6318.
Gavilan et al., "Adaptive Control for Aircraft Longitudinal Dynamics with Thrust Saturation", Journal of Guidance, Control, and Dynamics, vol. 38, No. 4, Apr. 9, 2014, pp. 651-661.

Hauser et al., "Aggressive flight maneuvers", Proceedings of the 36th IEEE Conference on Decision and Control, Dec. 12, 1997, vol. 5, pp. 4186-4191, doi: 10.1109/CDC.1997.649490.
Holden et al., "Uber elevate: Fast-forwarding to a future of on-demand urban air transportation", Uber, Tech. Rep., Oct. 27, 2016, 98 pgs.
Johansen et al., "On estimation of wind velocity, angle-of-attack and sideslip angle of small UAVs using standard sensors", Proceedings of the International Conference on Unmanned Aircraft Systems (ICUAS), Denver, Colorado, Jun. 9-12, 2015, pp. 510-519.
Lee, "Exponential stability of an attitude tracking control system on so (3) for Targe-angle rotational maneuvers", Systems & Control Letters, Jan. 2012, vol. 61, No. 1, pp. 231-237, doi: 10.1016/j.sysconle.2011.10.017.
Lee et al., "Nonlinear Adaptive Flight Control Using Backstepping and Neural Networks Controller", Journal of Guidance, Control, and Dynamics, vol. 24, No. 4, Jul. 2001, pp. 675-682.
Meier et al., "Pixhawk: A micro aerial vehicle design for autonomous flight using onboard computer vision", Autonomous Robots, Aug. 2012, vol. 33, No. 1-2, pp. 21-39, doi: 10.1007/s10514-012-9281-4.
Mellinger et al., "Minimum snap trajectory generation and control for quadrotors", IEEE International Conference on Robotics and Automation, May 9-13, 2011, pp. 2520-2525, doi: 10.1109/ICRA.2011.5980409.
Oosedo et al., "Optimal transition from hovering to level-flight of a quadrotor tail-sitter uav", Autonomous Robots, 2017, First Published Jul. 25, 2016, vol. 41, No. 5, pp. 1143-1159, doi: 10.1007/s10514-016-9599-4.
Park et al., "Fault tolerant flight control system for the tilt-rotor uav", Journal of the Franklin Institute, Nov. 2013, vol. 350, No. 9, pp. 2535-2559, doi: 10.1016/j.jfranklin.2013.01.014.
Popowski et al., "Measurement and estimation of the angle of attack and the angle of sideslip", Aviation, vol. 19, No. 1, Mar. 30, 2015, pp. 19-24.
Pucci, "Towards a unified approach for the control of aerial vehicles", Ph.D. dissertation, INRIA Sophia Antipolis, France, 2013, 160 pgs.
Ritz et al., "A global controller for flying wing tailsitter vehicles", IEEE International Conference on Robotics and Automation, May 29-Jun. 3, 2017, pp. 2731-2738, doi: 10.1109/ICRA.2017.7989318.
Shi et al., "Nonlinear Control of Autonomous Flying Cars with Wings and Distributed Electric Propulsion", in 2018 IEEE Conference of Decision and Control (CDC, 2018, pp. 5326-5333.
Slotine et al., "Applied Nonlinear Control", Prentice Hall, 475 pgs. (presented in three parts).
Slotine et al., "Composite adaptive control of robot manipulators", Automatica, vol. 25, No. 4, Jul. 1989, pp. 509-519.
Stone et al., "Flight testing of the t-wing tail-sitter unmanned air vehicle", Journal of Aircraft, Mar.-Apr. 2008, vol. 45, No. 2, pp. 673-685, doi: 10.2514/1.32750.
Tian et al., "Model Aided Estimation of Angle of Attack, Sideslip Angle, and 3D Wind without Flow Angle Measurements", Proceedings of the AIAA Guidance, Navigation, and Control Conference, Kissimmee, Florida, Jan. 8-12, 2018, pp. 1-13.
Verling et al., "Model-based transition optimization for a VTOL tailsitter", Proceedings of the IEEE International Conference on Robotics and Automation (ICRA), Singapore, May 29-Jun. 3, 2017, pp. 3939-3944.
Zhou et al., "A Unified Control Method for Quadrotor Tail-sitter UAVs in All Flight Modes: Hover, Transition, and Level Flight", Proceedings of the IEEE/RSJ International Conference on Intelligent Robots and Systems (IROS), Vancouver, BC, Canada, Sep. 24-28, 2017, pp. 4835-4841.
International Preliminary Report on Patentability for International Application No. PCT/US2020/054802, Report dated Apr. 12, 2022, dated Apr. 21, 2022, 6 Pgs.

* cited by examiner

AIRFLOW SENSING BASED ADAPTIVE NONLINEAR FLIGHT CONTROL OF A FLYING CAR OR FIXED-WING VTOL

CROSS-REFERENCE TO RELATED APPLICATIONS

The present, invention claims priority to U.S. Provisional Patent Application Ser. No. 62/912,150, filed Oct. 8, 2019, the disclosures of which is herein incorporated by reference in its entirety.

FIELD OF THE INVENTION

This invention generally relates to the control of Vertical Take Off and Landing (VTOL) vehicles. More specifically, it relates to improving the control of a VTOL during any transition phase of the vehicle.

BACKGROUND

Vertical take-off and landing (VTOL) aircraft have been an area of intense research for most of the past century. A variety of VTOL craft have been developed in the military and civilian spaces. The operational simplicity associated with not requiring a runway and being able to hover in place often outweigh the negative aspects of the design complexity. In recent years, improvements in battery technology, computing power, and sensor availability have spurred the development of multi-rotors.

Depending on the configuration of thrusters on the craft, fixed-wing VTOL can be categorized as tilt-rotor, tail-sitter, or copter-plane. Although different in geometry, the underlying control logic is similar. Most controllers designed for such crafts rely on two separate schemes, one for VTOL and one for fixed-wing. A transition strategy is designed to switch between the two. Because of the hybrid nature during this transition period, complex interactions between propellers and wings pose challenge for accurate and safe flight maneuvers. Typical transition methods utilize overlapping control systems or overlapping the envelope of the VTOL and fixed wing controllers in order to move between flight modes. Despite the advancements in the development of VTOL and the necessary transition period of such craft, many control methodologies fail to adequately consider the effects of altering aerodynamic forces during real time flight. Typical configurations are only capable of performing the transition between flight modes by over or under compensating one mode for the other. Accordingly, improvements to the method of transition for more accurate and precise movement are needed.

SUMMARY OF THE INVENTION

Many embodiments are directed to an aircraft vehicle control system with a trajectory planner module configured generate a set of trajectory data. The control system also has a position controller connected to an attitude controller, where the position controller provides input to the attitude controller, and wherein the attitude controller provides input data to a force allocation module, and wherein the force allocation module receives the trajectory data. Additionally, the control system can have a three-dimensional airflow sensor module connected to the force allocation module and configured to provide incident velocity airflow data to the force allocation module. The force allocation module generates a composite adaptive force model based on the airflow sensor data, the trajectory data, and the controller input data, and the force allocation module generates force input data for at least a plurality of rotors such that the plurality of rotors respond to the generated force input data thereby altering a dynamic position of the vehicle.

In other embodiments, the force allocation module generates force input data for a plurality of control surfaces disposed on the vehicle such that the control input data for the plurality of control surfaces configures the position of each of the plurality of control surfaces to maintain an equilibrium state of the vehicle.

In still other embodiments, the airflow sensor module is connected to three-dimensional air flow sensor.

In yet other embodiments, the vehicle is a VTOL.

In still yet other embodiments, the vehicle is a fixed-wing VTOL.

Other embodiments include a method for controlling a vehicle including;
utilizing a control system to activate at least a plurality of thrust rotors disposed on an aircraft vehicle and configured to generate a propulsion of the vehicle in a first direction;
adjusting the position and thrust from at least one of the thrust rotors to propel the vehicle in a second direction;
measuring a set of dynamic forces on the aircraft vehicle and determining a desired attitude of the aircraft vehicle through a force allocation module;
determining a change in force required for each of the plurality of thrust rotors in order to maintain an equilibrium state of the aircraft vehicle; and
allocating a new force component to each of the plurality of thrust rotors based on the determined force in order to maintain the equilibrium state of the vehicle.

In still other embodiments, the control system is further configured to activate a plurality of control surfaces disposed on the aircraft vehicle wherein the activation of the control surfaces can be used to adjust the dynamic forces on the aircraft vehicle.

In yet other embodiments, the method of utilizes the plurality of control surfaces to help move and maintain the vehicle in the second direction.

In still yet other embodiments, the method further determines the change in force required for each of the plurality of control surfaces in conjunction with the change in force required for each of the plurality of thrust rotors; and allocating a new force component for each of the plurality of control surfaces based on the determined force for both the thrust rotors and the control surfaces in order to maintain the equilibrium state of the aircraft vehicle.

In other embodiments, at least one of the plurality of thrust rotors is a horizontal thrust rotor.

In still other embodiments, more than one of the thrust rotors is a vertical thrust rotor.

In yet other embodiments, measuring the set of dynamic forces further comprises receiving velocity input data from an airflow sensor.

In still yet other embodiments, the airflow sensor is a three-dimensional airflow sensor.

In other embodiments, the three-dimensional airflow sensor has a conical tip with at least a central orifice and a plurality of circumferential orifices such that each of the orifices can be used to determine the pressure differential across the sensor and generate an incident velocity data set.

Other embodiments are directed to an aircraft vehicle with a body portion and a plurality of thrust rotors configured to generate thrust to propel the vehicle in a first direction. The aircraft also has a control module disposed within the vehicle and configured to distribute power to each of the plurality of thrust vectors. Additionally the aircraft has an airflow sensor connected to a portion of the vehicle and wherein the sensor is disposed in a location that is in line with the direction of flight of the aircraft vehicle.

In yet other embodiments, the aircraft has a wing portion fixed to the body portion and wherein the wing portion has a plurality of control surfaces that can be manipulated or moved in a number of different directions such that the movement of the respective control surfaces can affect a relative position and attitude of the aircraft vehicle and wherein the control module is configured to distribute control commands to each of the control surfaces based on a calculated position and attitude of the vehicle such that the vehicle maintains an equilibrium state.

In still yet other embodiments, the control module is configured to receive incident velocity airflow data from the airflow sensor and utilize the incident velocity airflow data to allocate a new power function to each of the plurality of thrust vectors and each of the control surfaces in order to maintain the equilibrium state of the vehicle.

DETAILED DESCRIPTION

Turning now to the drawings, systems and methods for a fixed wing VTOL that is configured with a composite adaptive nonlinear controller capable of improving the flight control of the VTOL during one or more transition phases during flight. Many embodiments are directed to a VTOL aircraft equipped with a plurality of rotors designed to generate thrust in a horizontal and/or vertical direction. The VTOL also has at least one fixed wing with one or more control surfaces, such that the manipulation of the control surfaces can act to adjust the attitude of the VTOL. Many embodiments may have additional control surfaces operable to contribute to the attitude of the VTOL. In many embodiments the VTOL has a composite adaptive controller configured to receive the inputs from a variety of sensors including a three-dimensional velocity sensor designed to measure the incident velocity fluctuations during flight. Accordingly, the composite adaptive controller can receive the input from the variety of sensors and allocate respective force vectors to the variety of control surfaces and/or rotors in order to maintain a desired flight trajectory or an equilibrium state of flight.

Figure 1:
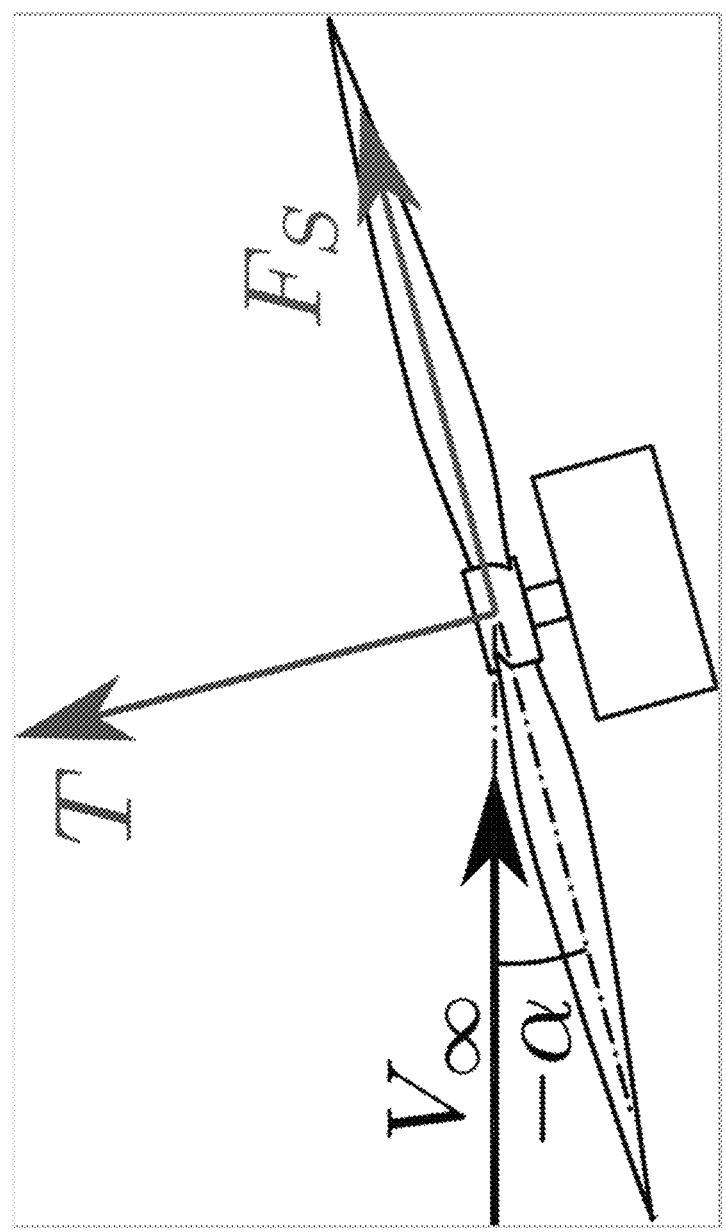
FIG. 1 Illustrates a force diagram of a rotor for a traditional VTOL.
Figure 2:
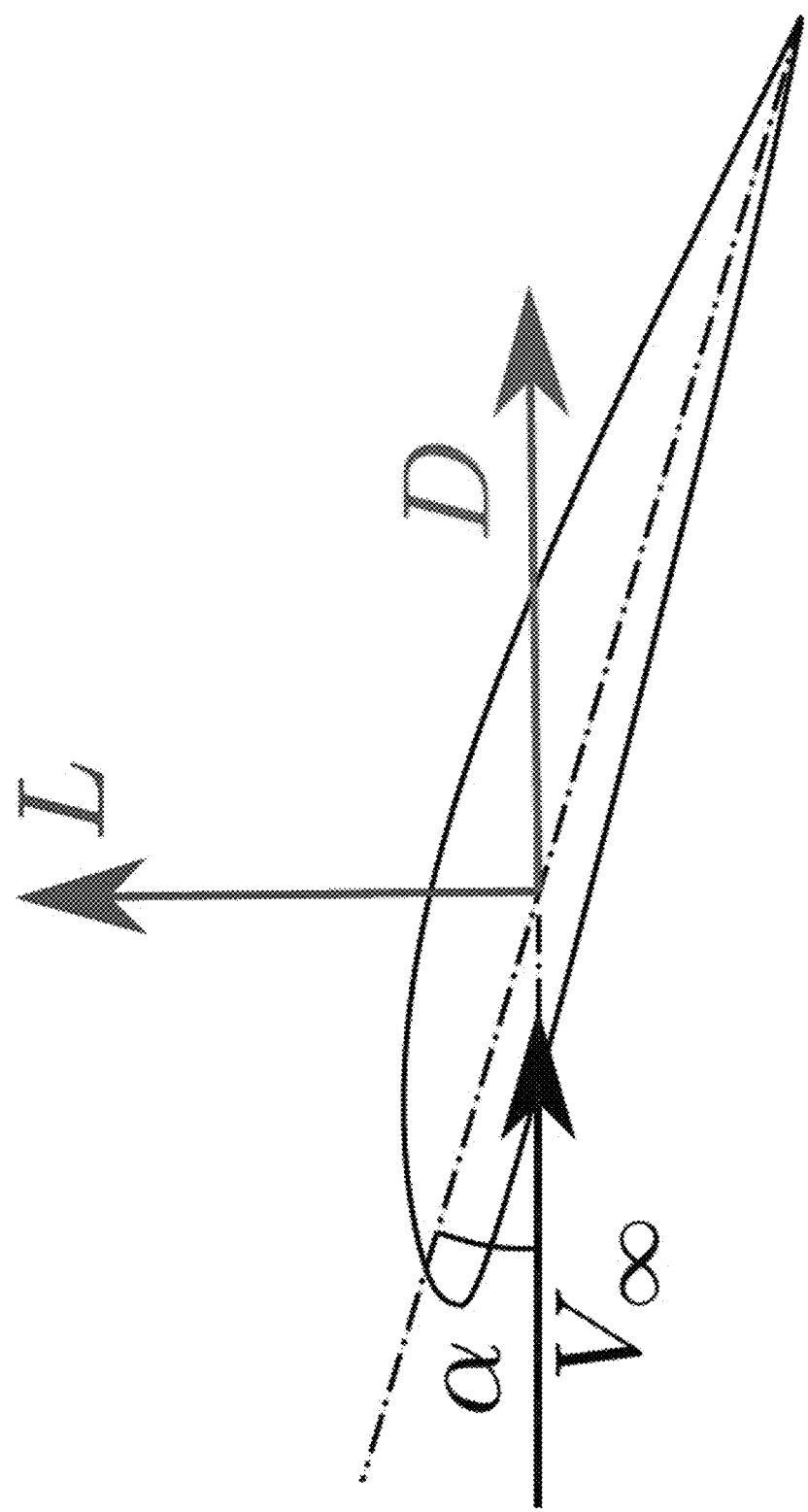
FIG. 2 Illustrates a force diagram of a fixed-wing portion of an aircraft.

VTOL aircraft can come in a number of different forms, and as previously discussed, have been of great interest in a number of different areas due to the flexibility of use that such aircraft offer. Fixed-wing VTOL as previously mentioned, offer some unique capabilities over a traditional VTOL in that a fixed-wing VTOL can offer longer sustained flight often associated with the fixed wing portion. As illustrated in FIGS. 1 and 2 the various aspects or components of fixed-wing VTOL aircraft can produce a number of different forces that can affect the overall attitude of an aircraft. For example, FIG. 1, illustrates the traditional force model of a rotor found in many traditional VTOL aircraft. Similarly, FIG. 2 illustrates the typical forces seen in a fixed-wing design. The fixed wing is often use to generate the lift on the vehicle. The lift can be adjusted by the control or adjustment of the wing's angle of attack and other control features often found on winged surfaces. The lift must be sufficient to overcome the affects of drag that is naturally introduces on the trailing edge of a wing as air moves across the surface of the wing. In a traditional fixed wing aircraft, the forward thrust is generated by a propeller or some other type of rotating "wing" that can generate thrust. This is often reflected in the form of a vertically mounted rotor, however, can be achieved with horizontal rotors and adjusting the respective angle of attack of the rotor to generate forward thrust.

As can be appreciated, many fixed-wing VTOL aircraft tend to offer two different forms of flight, both vertical and horizontal. Accordingly, the unique configurations of many fixed-wing VTOL can require unique and complex control schemes in order to offer accurate flight prediction and control. Many vehicles, as described above, need to "transition" between stages of flight, such as vertical movement and horizontal movement. Transitions can occur not only during take off and landing, but can also occur throughout the flight when vehicles are exposed to high winds, cross-winds, or any changes in flight condition that may require some type of attitude control adjustment to the vehicle. Traditional VTOL aircraft and fixed-wing VTOL aircraft tend to use multiple controllers or multiple control envelopes that often overlap in order to allow for a control of the vehicle during the transition stages. For example, during a take off transition, reference commands can be sent to the VTOL controller (vertical rotors) such that the vehicle would either reach a high-speed or a low pitch angle state thus triggering the fixed-wing controller to become active. A common technique for tilt-rotor transition is to vary tilt angles following a monotonic schedule, during which the controller stabilizes the craft. Furthermore, many control methodologies tend to develop specific transition regimes for each of the controllers in order to transition between flight modes. However, many such control methods offer little attention to aerodynamic and flight-dynamic modeling in this scenario.

Some of the more recent methods utilize numerical optimization to solve for a vehicle trajectory based on accurate vehicle dynamics. Some techniques solve for transition trajectories offline and then deploy feedback tracking controllers to execute them online or in flight. Some manufactures have proposed the use of online optimization-based controllers with global aerodynamic models for tail-sitters. Such controllers can give solutions between any global states, as long as the on board computer can solve the problem in real time.

Despite such success, heavy computation requirements still put a burden on the craft, especially for small scale UAVs with limited payload and power. Furthermore, iterative solvers are often several orders of magnitude slower than a simple feedback controller. Execution speed can be critical for agile flyers. Although some developments have been made in the direction of a unified feedback controller for fixed-wing VTOL, the success of these controllers relies primarily on the accurate prediction of aerodynamic forces, which in turn requires high-fidelity models and accurate sensor feedback for states relevant to such forces. Moreover, many such development strategies fail to consider the complex aerodynamic interactions between wing and rotors that are crucial to fixed-wing VTOL transition. Although some efforts have been made to estimate aerodynamic states such as angle-of-attack and side-slip angle, many control methodologies utilize do not such information directly in a feedback control manner. On the other hand, some control methodologies have used adaptive flight control where the vehicle model is adapted via either aerodynamic coefficients or neural network parameters.

Control Architecture

In contrast to prior developments in the control of fixed-wing VTOL, many embodiments are directed to a fixed-wing VTOL that utilizes a non-linear unified adaptive control model that incorporates the input from a three-dimensional airflow sensor for accurate aerodynamic force prediction. Numerous embodiments implement adaptive force allocation models that are capable of demonstrating a convergence of tracking and prediction errors by the utilization of improved sensing abilities with a three-dimensional air flow sensor.

In general, many embodiments may consider a six degree-of-freedom (DOF) dynamics model for VTOL aircraft. The system states are defined by inertial position p and velocity v; attitude as rotation matrix $R \in SO(3)$; and angular velocity $\omega$ in the body frame. The dynamics can be expressed as:

$$\dot{p}=v \quad \dot{v}=g+Rf_b \quad (1)$$

$$\dot{R}=RS(\omega) \quad J\dot{\omega}=S(J\omega)\omega+\tau_b \quad (2)$$

where $J \in \mathbb{R}^{3\times3}$ is the inertia matrix of the vehicle in body-frame, g is the constant gravity vector in the inertial frame $S(\cdot): \mathbb{R}^3 \rightarrow +SO(3)$ is a skew-symmetric mapping such that $a \times b = S(a)b$. External forces and moments on the vehicle are grouped into $f_b$ and $\tau_b$. $f_b$ is normalized with mass and has units of m/s².

In accordance with numerous embodiments the respective force models take into account the various types of forces and potential moments that can be created on the vehicle during transition states of the vehicle and at various air speeds. Accordingly, such models can be used to precisely control the velocity of the vehicle during the respective transition states. For example, many embodiments of control methods utilize the respective force and moment calculations as generalized control inputs in order to track position and attitude trajectories and thus eliminate the need for a specific transition control methodology during transition flight regimes. Such methods can be utilized in simplified feedback controllers that offer a much faster response time for online flight calculations and adjustments.

Numerous embodiments of control models can consider the relative wind velocity for the force models, which can be represented by equation 3 below.

$$v_i = R^T(v-v_\omega) \quad (3)$$

Likewise, the relative thrust and potential side force that can be generated from the rotors can be represented by equations 4 and 5 respectively $$T_x = \overline{C}_{Tx} u_x^2, \quad T_z = \overline{C}_{Tz} u_z^2, \quad (4)$$

$$F_S = \overline{C}_S \cdot G(\alpha, V_\infty, u_z). \quad (5)$$

In addition to the wind velocity and respective rotor forces, many predictive force models can further consider the relative forces generated from the fixed-wing portion of the vehicle. Fixed-wing aircraft generate lift and drag aerodynamic forces and can be illustrated by a common linear aerodynamics model for both drag and lift illustrated in equations 6 and 7 below.

$$C_L = C_{L_0} + C_{L_1}\alpha \quad (6)$$

$$C_D = C_{D_0} + C_{D_1}\alpha + C_{D_2}\alpha^2, \quad (7)$$

Accordingly, the estimated aerodynamic and thruster forces on a vehicle can be expressed as a combination or composite of the two main types of forces on the vehicle illustrated below in equations 8 and 9.

$$\hat{f}_T = \begin{bmatrix} \overline{C}_{Tx} u_x^2 \\ 0 \\ -\overline{C}_{Tz} u_z^2 \end{bmatrix} + \begin{bmatrix} -\overline{C}_S G_z(\alpha, V_\infty, u_z)\cos(\beta) \\ -\overline{C}_S G_z(\alpha, V_\infty, u_z)\sin(\beta) \\ 0 \end{bmatrix} \quad (8)$$

$$\hat{f}_A = \frac{1}{2}\rho S_{ref} V_\infty^2 \begin{bmatrix} -C_L(\alpha)\sin\alpha - C_D(\alpha)\cos\alpha \\ -C_Y(\beta) \\ -C_L(\alpha)\cos\alpha - C_D(\alpha)\sin\alpha \end{bmatrix}. \quad (9)$$

In accordance with many embodiments the relative force models illustrated above can be utilized in a unified composite adaptive control system architecture in order to determine the appropriate force commands for the relative components of the vehicle. This can be done in a multi-step process that that includes solving for the desired attitude of the vehicle and the appropriate thruster force allocation. Once the desired attitude and force allocations have been determined or estimated, the force models can be combined into a parameterized form with a basis matrix and parameterized vector illustrated below.

$$\hat{f}_b = \hat{f}_T + \hat{f}_A = \Phi(v_i, u_x, u_z)\hat{\theta}$$

where $\Phi$ denotes the model basis and the model parameter vector is $$\hat{\theta} = [\overline{C}_{Tx}, \overline{C}_{Tz}, \overline{C}_S, C_{D_0}, C_{D_1}, C_{D_2}, C_{L_0}, C_{L_1}]^T.$$

Subsequently a composite adaptation scheme can be used to update the parameter vector in real-time using both velocity tracking error as well as the acceleration prediction error. In many embodiments the composite adaptation technique is used to facilitate the convergence of the velocity tracking error and the acceleration prediction error. In some embodiments a recursive least-square formulation with recursive exponential forgetting can be adopted to improve prediction accuracy without diminishing the transient response overshoot.

Figure 3:
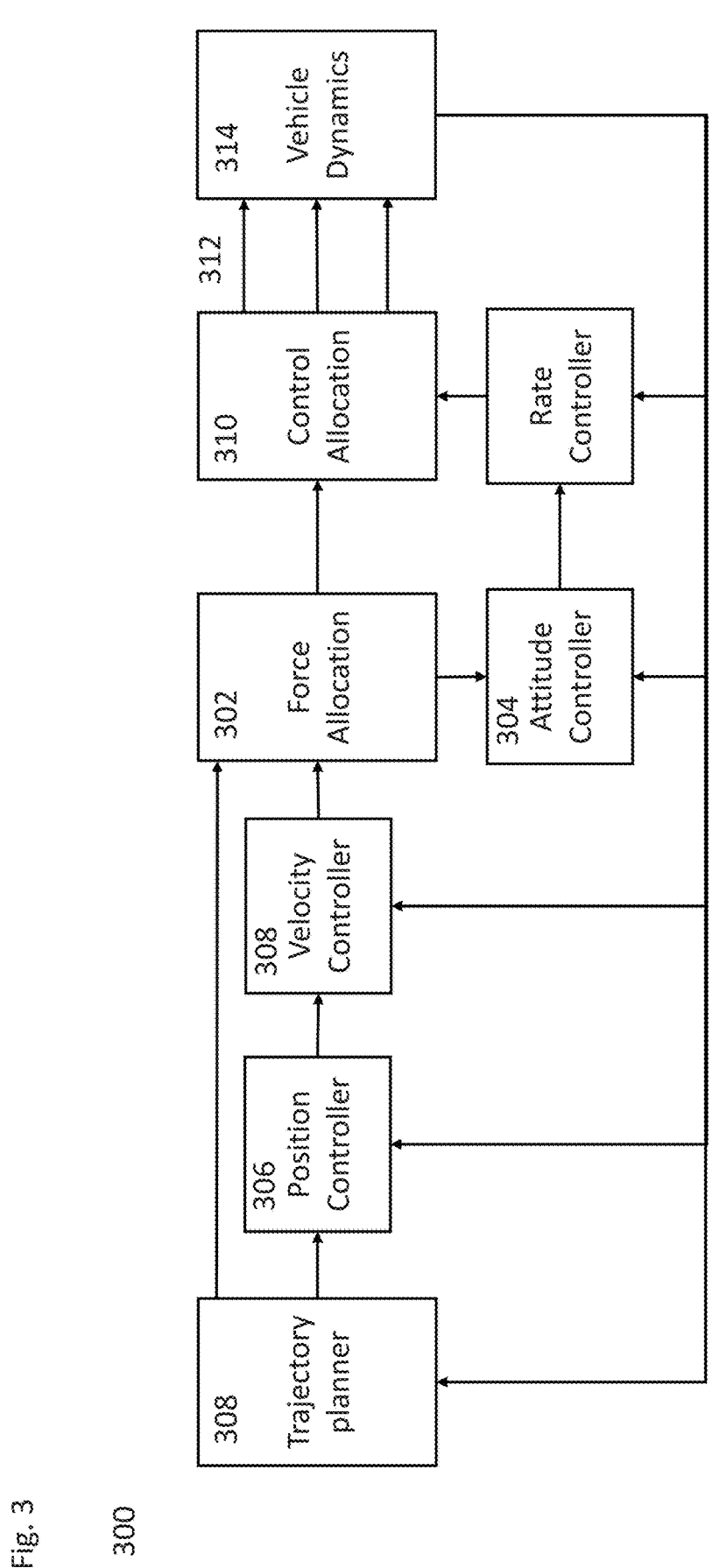
FIG. 3 Illustrates a vehicle control methodology in accordance with embodiments of the invention.

Turning now to FIG. 3, an embodiment of a control system, similar to that discussed above is illustrated. The control system 300 can be illustrated in a closed loop system that determines the appropriate force allocation 302 for the attitude controller 304 through the inputs of a position controller 306 and a velocity controller 308 as well as the trajectory planner 309. Accordingly, subsequent control allocation module 310 can be used to allocate the proper forces 312 to the various components of a vehicle in order to control the vehicle dynamics (314) to keep the vehicle in an equilibrium state. In numerous embodiments such force allocation techniques can be augmented and improved through the use of the three-dimensional pressure sensor as mentioned above.

Figure 4:
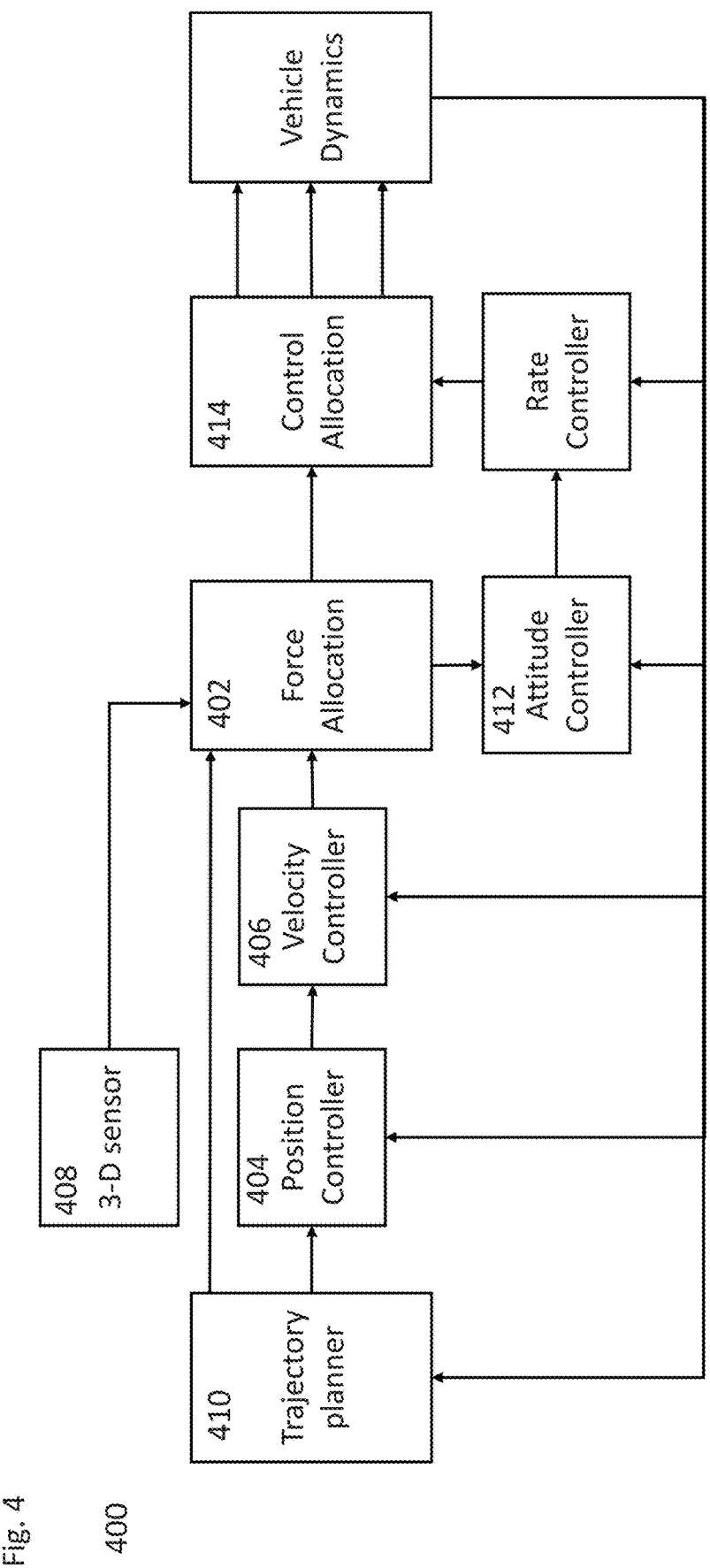
FIG. 4 Illustrates a vehicle control system with a three-dimensional airflow sensor in accordance with embodiments of the invention.

For example, FIG. 4 illustrates a control system 400 with similar force allocation module 402 dependent on the respective position controller 404 and velocity controller 406 inputs. However, the control system 400, in numerous embodiments, can incorporate the input of incident wind velocity as measured by the use of a novel three-dimensional pressure sensor 408. The 3-D pressure sensor 408, can be used to detect the incident velocity in the body frame and can be illustrated as:

$$v_i = \sqrt{\frac{2q_\infty/\rho}{q_\infty^2 + (kq_\beta)^2 + (kq_\alpha)^2}} \begin{bmatrix} q_\infty \\ kq_\beta \\ kq_\alpha \end{bmatrix} \quad (10)$$

In many embodiments the control system 400 may also include the use of a trajectory planner 410 and attitude controller 412 to distribute the proper control allocation forces 414 in order to maintain the vehicle dynamics in the various flight conditions. The feedback from the sensor 408 can provide an accurate estimate of the incident airspeed vector $v_i$, which enables the aircraft to fly at desired aerodynamic conditions. The airspeed vector can then be used in the force model described above in order to compensate for the aerodynamic forces and to provide an accurate adaptation to the surrounding conditions and ensure a more precise vehicle trajectory.

Figure 5:
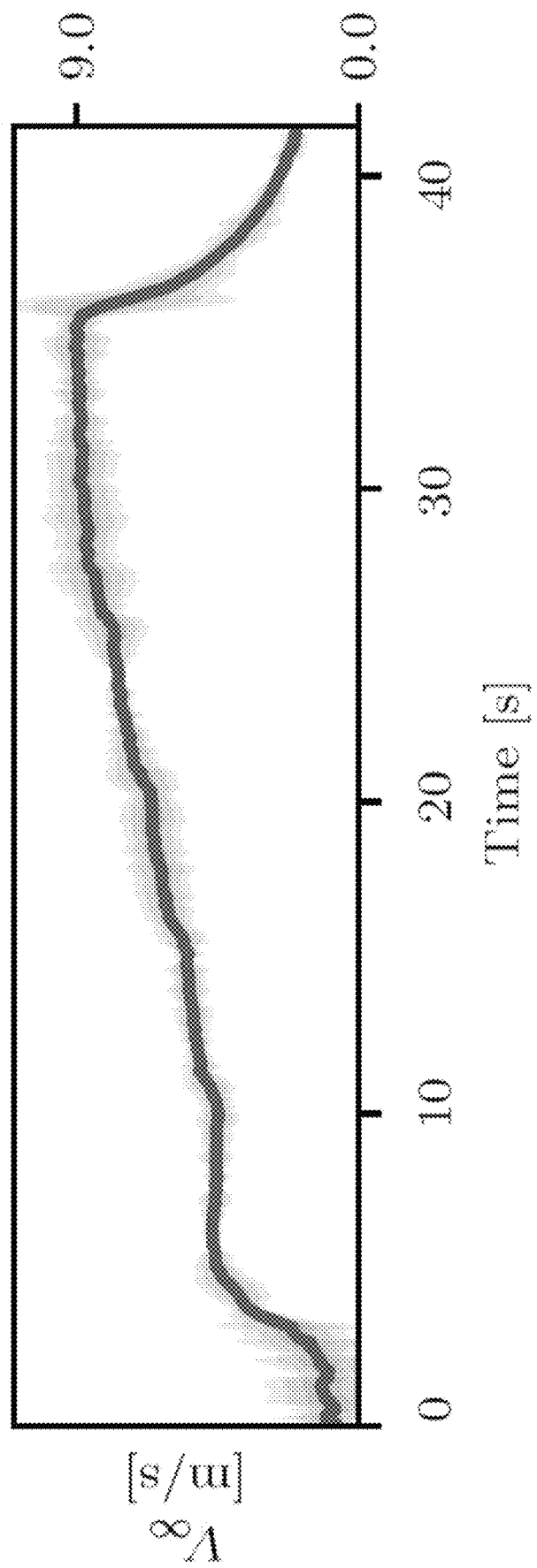
FIG. 5 Is a graphical illustration of air flow velocity over time as used in conjunction with various embodiments of the invention.
Figure 6:
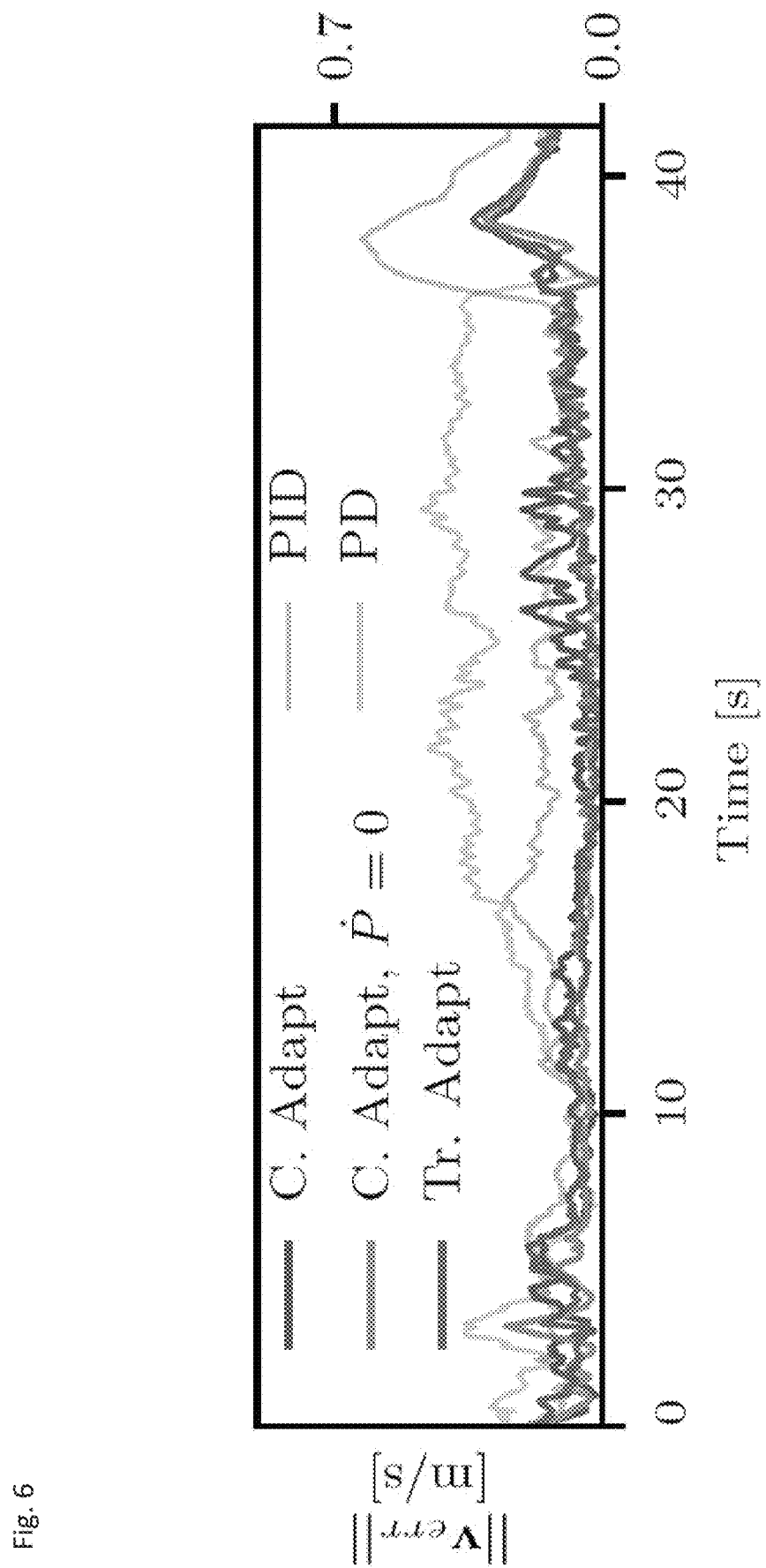
FIG. 6 Is a graphical comparison between different types of controllers in conjunction with the total airspeed in accordance with embodiments of the invention.
Figure 7:
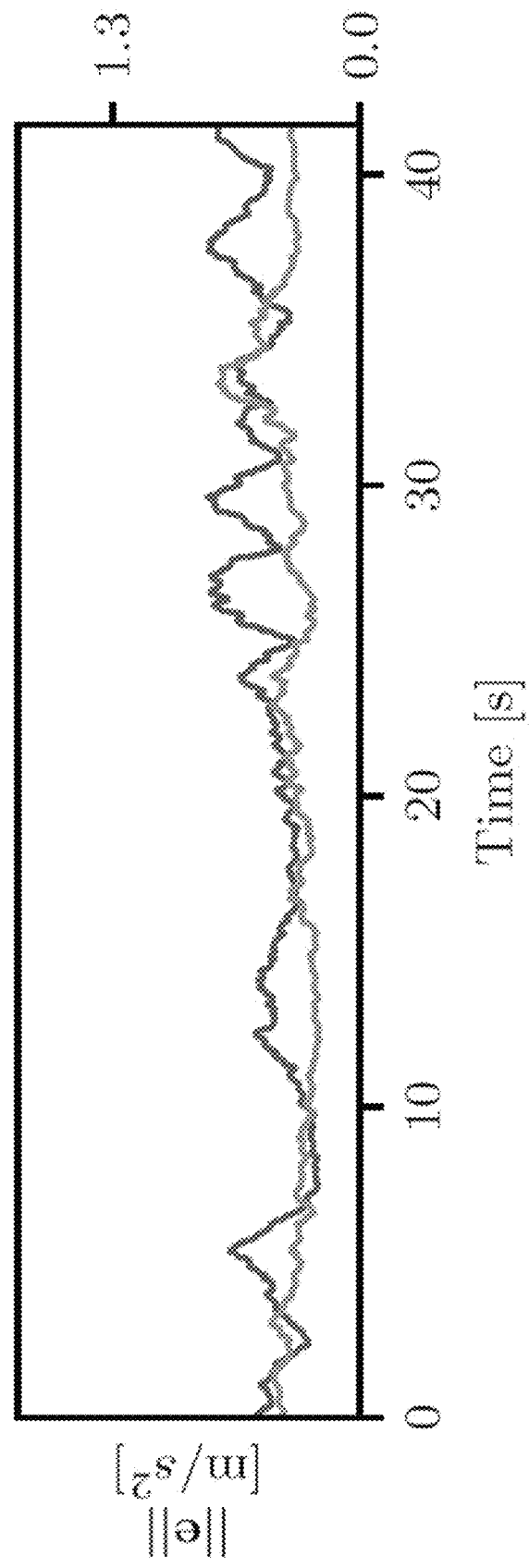
FIG. 7 Is a graphical comparison between the prediction errors for various composite controllers in accordance with embodiments of the invention.
Figure 8:
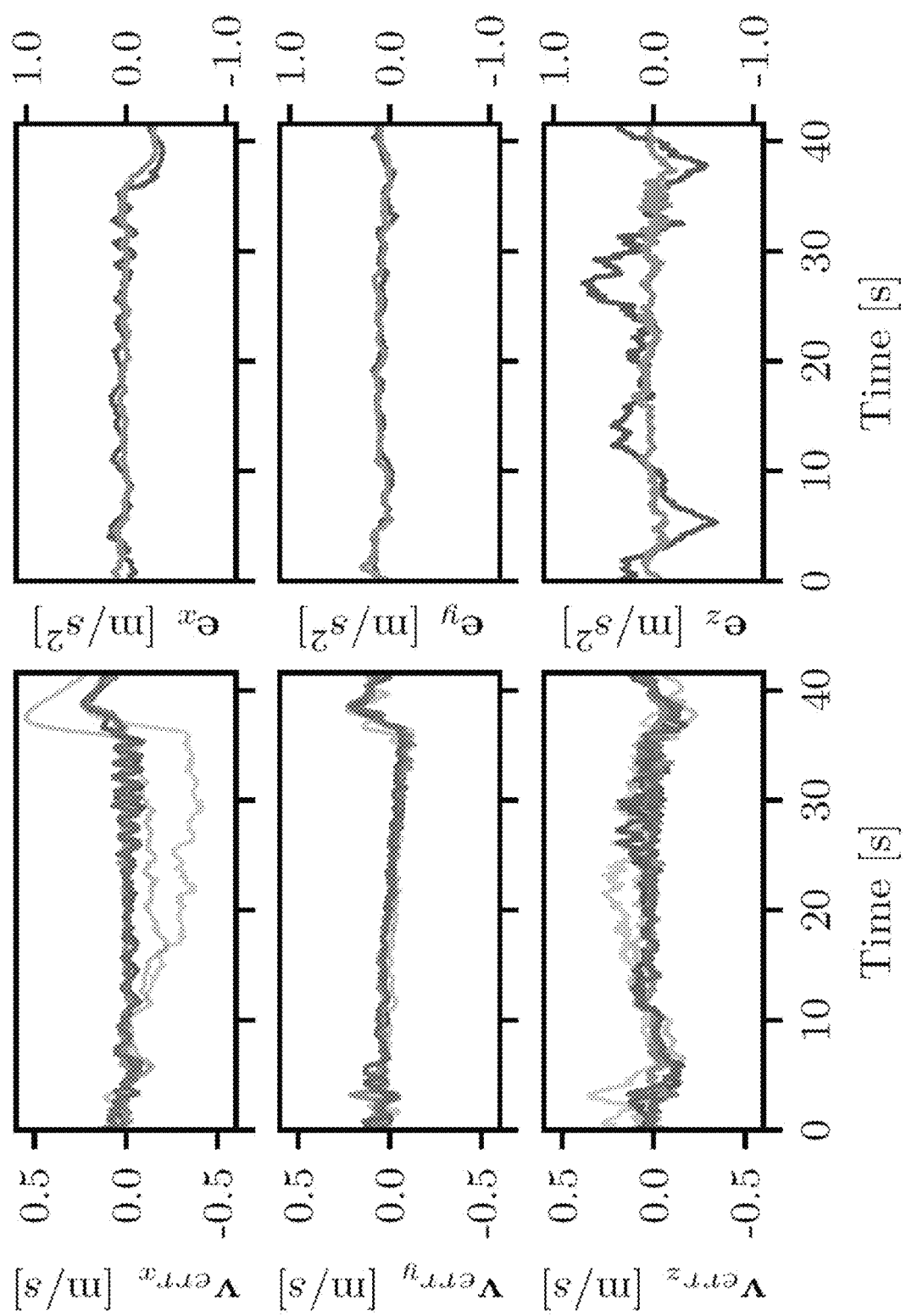
FIG. 8 Is a graphical comparison between the various velocity tracking errors and acceleration prediction errors of numerous control systems in accordance with embodiments of the invention.

Moving to FIGS. 5 though 7, embodiments of flight controllers respective response to varying wind speeds is shown. For example, FIG. 5 illustrates a graph of respective wind speed 502 that a fixed-wing VTOL may be subject to over a period of time. In comparison, FIG. 6 is a graphical illustration of respective transient response from different control systems with respect to the wind speed illustrated in FIG. 5. It can be appreciated that more traditional controllers such as Proportional Differential (PD) 602 or Proportional Integrated Differential (PID) 602 demonstrate significant transient overshoot with various changes in wind velocity. This is especially true from when wind velocity dropped to near zero art around 37 seconds. In contrast, the composite adaptive controller that includes the incident wind velocity input, in accordance with numerous embodiments, demonstrates improved tracking capabilities in maintaining vehicle flight dynamics during abrupt changes to flight scenarios. Although the various adaptations of the composite adaptive controllers (604-608) illustrate different transient responses, it can be appreciated the composite adaptive controller and control method, in many embodiments, offers an improved transient response over more traditional controllers that may need to develop multiple models for transition responses. FIG. 7 further illustrates the convergence of the velocity tracking error and the acceleration prediction error for the respective composite adaptive controllers. Additionally, FIG. 8 illustrates a comparison between the respective errors from each of the controllers illustrated in FIG. 6 for each of the various axis. It can be appreciated, that the composite adaptation models demonstrate improved convergence and reduced error over the more traditional controller methods.

Figure 9:
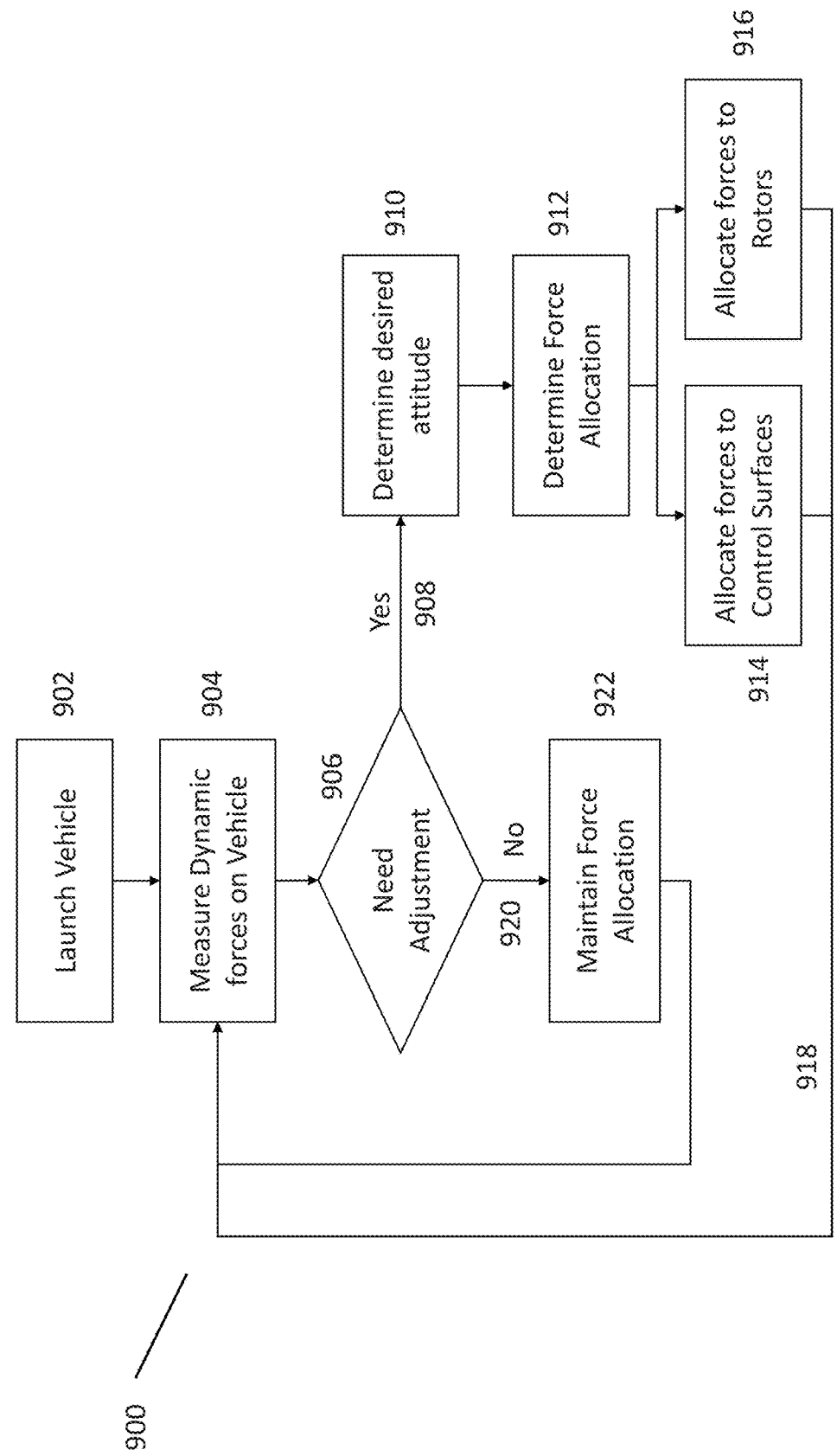
FIG. 9 Illustrates process flow diagram of a vehicle control method in accordance with embodiments of the invention.
Figure 10:
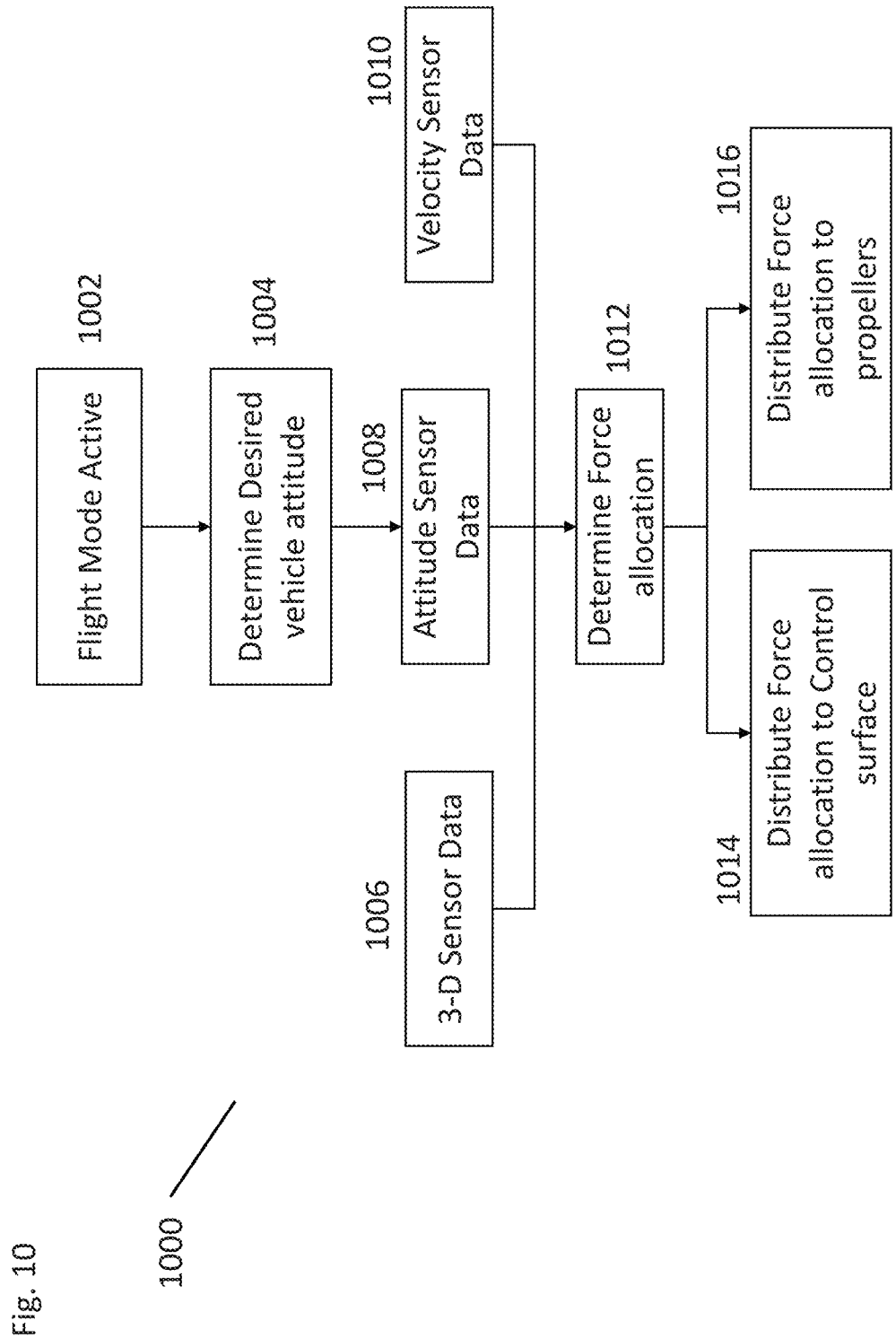
FIG. 10 Illustrates a process flow diagram of a vehicle control method in accordance with embodiments of the invention.

Turning now to FIGS. 9 and 10, various applications of such control systems can be demonstrated. For example, FIG. 9 illustrates a vehicle control method 900 in which a vehicle is launched (902) and the control system measures the dynamic forces on the vehicle (904), including the input from a incident velocity sensor. The control system can then determine if adjustments need to be made to the various components (906). In other words the vehicle force allocation models can be used in conjunction with the attitude control models to determine if new force allocations should be generated to maintain an equilibrium state. If adjustment is needed (908) then the controller can determine the desired attitude (910) based on the data inputs and subsequently determine the appropriate or needed force allocations (912) for the respective components such as rotors and/or control surfaces. Subsequently, the controller can distribute or allocate respective forces to control surfaces (914) and/or the rotors (916). As can be appreciated, many embodiments may utilize a closed looped feedback system 918 to continually measure the respective forces (904) on the vehicle that can include the forces generated by the adjustment of the control surface and/or rotors. Additionally, it can be appreciated that if no adjustment is needed (920) the vehicle can maintain the current disposition of force allocation (922) to the respective components of the vehicle.

In other embodiments, the vehicle control system can be expressed through a process that includes the various input data from a number of different sensors. For example, FIG. 10 illustrates a vehicle control system 1000 where the flight mode of a vehicle is activated (1002). In other words, the control system activates the rotors and/or control surfaces to initiate the flight of the vehicle. In many embodiments, the flight initiation is in a vertical mode consistent with VTOL aircraft. Once in flight a vehicle control system can determine the desired vehicle attitude (1004). Subsequently, the control system can utilize various sensor input data including, but not limited to, 3-D airflow sensor data (1006), Attitude sensor data (1008), and/or velocity sensor data (1010) to determine the appropriate force allocation (1012). In many embodiments, the force and acceleration models illustrated above can be factored into determining the appropriate force allocation (1012). Finally, the required force for maintaining an equilibrium state of the aircraft can be distributed to the control surfaces (1014) and/or distributed to the rotors (1016) by the control system. The appropriate force allocation can be done relatively quickly and can be done in an efficient manner so as to allow a vehicle to transition from a vertical flight mode to a horizontal flight mode using the forces generated from the fixed-wing. Additionally, many embodiments of a control system are capable of adapting the force allocation (1012) in any number of transition sequences that could occur during flight, including moving from a horizontal flight to a vertical landing.

Figure 11:
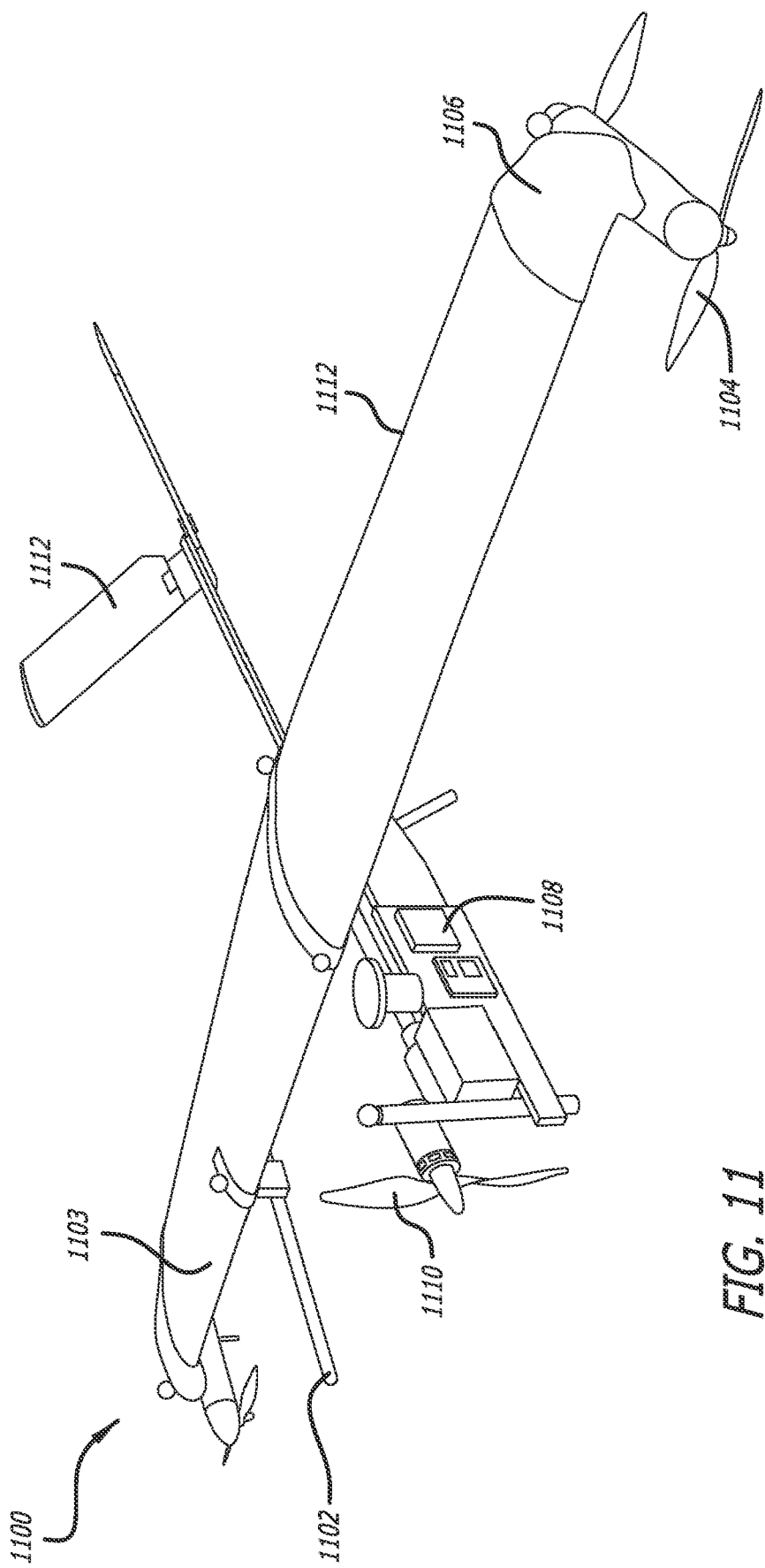
FIG. 11 Illustrates a fixed-wing VTOL in accordance with embodiments of the invention.

As can be readily appreciated, the various control methods and architectures described in the various embodiments can be implemented in any number of aircraft that may experience some type of transition state during flight. Such methods allow for a general characterization of force and moment inputs to be combined into a composite force allocation model. Accordingly, it can be appreciated that a number of different aircraft designs can be utilized to implement the use of the three-dimensional airflow velocity sensor. For example, FIG. 11 illustrates an embodiment of a fixed-wing VTOL 1100 with a three-dimensional airflow sensor 1102 affixed to the wing portion 1103 of the vehicle. A fixed-wing VTOL can be configured with multiple vertical thrust rotors 1104 that allow for the vertical movement, of the vehicle 1100. In some embodiments of a fixed-wing VTOL the vertical thrust rotors can be mounted to a portion of the wing 1103 such as the wing tip 1106 illustrated in FIG. 11. Some embodiments may attach the vertical thrust rotors 1104 to other locations such as along a body or fuselage of the vehicle. In numerous embodiments, the vehicle 1100 may have a controller 1108 the is electronically connected to the vertical thrust rotors 1104 as well as a horizontal thrust propeller 1110. Additionally, the controller 1108 may be connected to a number of different control surfaces 1112 that may include devices such as levelers, ailerons, rudders, flaps, stabilizers, etc. As can be appreciated, the controller 1108 can be programmed or configured with control methodologies described above in order to allow for the vehicle 1100 to operate more efficiently during transition phases. Although a specific vehicle configuration is illustrated, it can be appreciated that other embodiments may take on a different VTOL configuration. Moreover, any number of airborne vehicle systems can utilize the control methodologies described herein.

Referring back to the use of a three-dimensional air flow sensor, it can be appreciated that the design and configuration of such can take on a number of different configurations and can be placed in an number of different positions that is suitable for a vehicle. FIG. 11 for example illustrates the air flow sensor 1102 affixed to the wing with the sensor being positioned forward of the wingtip. This allows for the sensor to be positioned in a location that is relatively undisturbed by potentially turbulent airflow and/or high pressure airflow that can be generated from the vertical thrust rotors. Additionally, such placement can allow for the air flow sensor 1102 to be placed directly in the flight path to more accurately measure the incident velocity of the vehicle body.

Figure 12:
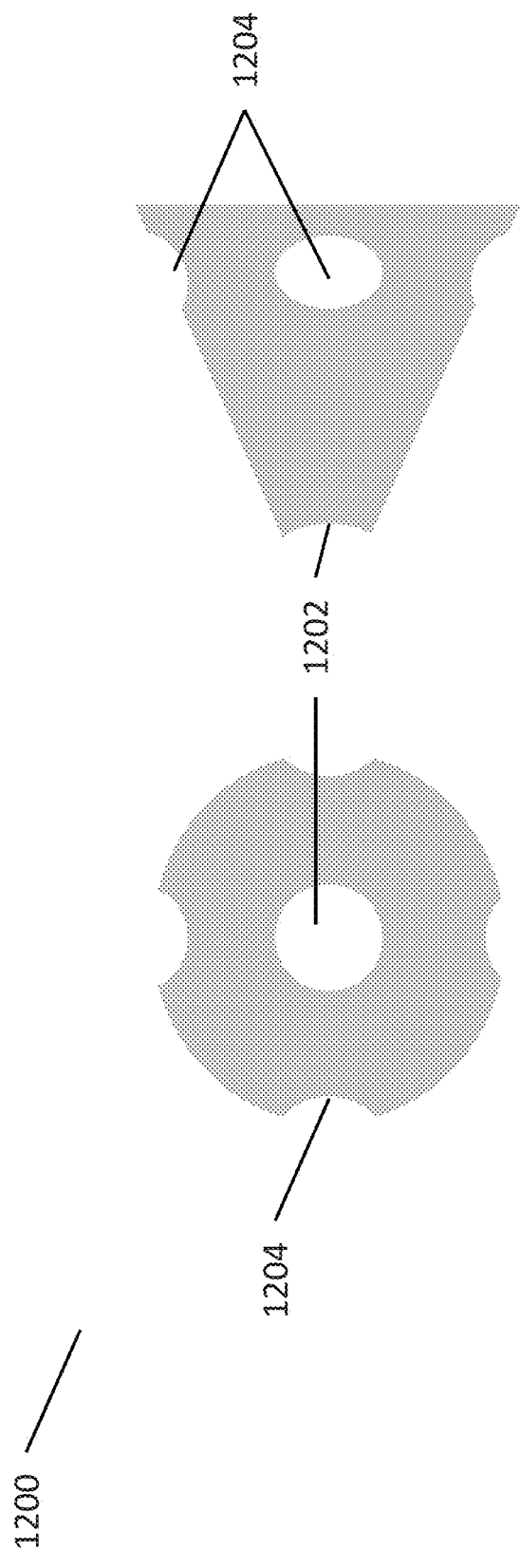
FIG. 12 illustrates a tip of an airflow sensor in accordance with embodiments of the invention.

In many embodiments the tip of the sensor can be configured to house a number of different small sensing devices. For example, FIG. 12 illustrates a front and side view of a sensor tip, in accordance with some embodiments. The sensor tip 1200 may be conical in shape and may have a central orifice 1202 that allows for airflow to enter the sensor housing. Additionally, embodiments of the sensor housing may have additional orifices 1204 positioned circumstantially around the center orifice 1202. Accordingly, each circumferential orifice 1204 can allow for air pressure to enter the housing and be read by the sensor. The difference in pressure for each pair of orifices can be translated into the incident velocity framework described above. Accordingly, the velocity can then be used to determine the appropriate force allocation to the rotors and control surfaces in accordance with many embodiments. The air flow sensor can use any type of sensing device that is suitable for the various flight parameters. In some embodiments the air flow sensor can use a SDP33 chip as a pressure sensor based on thermal mass flow. Such chip sets have little zero-pressure offset and drift, which can make them suitable for sensing flow angles. Moreover such chip sets have high response time (<3 ms) that make them suitable for use in an attitude control loop. Although a specific sensor is described, any number of sensor that has fast response times and little zero-pressure offset can be considered adequate for use in the airflow sensor.

Although the present invention has been described in certain specific aspects, many additional modifications and variations would be apparent to those skilled in the art. It is therefore to be understood that the present invention can be practiced otherwise than specifically described including the use of three-dimensional airflow sensors in a specific vehicle configuration as well as the sensor data in a specific control system without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents. Moreover, although various systems and methods of VTOL aircraft and associated controllers are described in the various embodiments, it should be understood that various combination of such vehicles and associated control systems can be included and or omitted as required by the vehicle design and/or function.

SUMMARY DOCTRINE OF EQUIVALENTS

As can be inferred from the above discussion, the above-mentioned concepts can be implemented in a variety of arrangements in accordance with embodiments of the invention. Specifically, the number and configuration of rotors and/or control surfaces within the VTOL and fixed-wing VTOL concept that can be controlled in a number of ways to improve transitions between flight modes. Additionally, many embodiments can be related specifically to the control methodologies that can improve transient response time during flight when transition like patterns may arise. Achieving such functionality, according to embodiments, involves the implementation of special arrangements/designs between subsystems described above, and their equivalents.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A aircraft vehicle control system, comprising:
a trajectory planner module configured generate a set of trajectory data;
a position controller connected to a velocity controller, wherein the position controller provides input to the attitude controller, and wherein the attitude controller provides input data to a force allocation module, and wherein the force allocation module receives the trajectory data;
a three-dimensional airflow sensor module connected to the force allocation module and configured to provide incident velocity airflow data to the force allocation module, wherein the force allocation module generates a composite adaptive force model based on the airflow sensor data, the trajectory data, and the controller input data, and wherein the force allocation module generates force input data for at least a plurality of rotors such that the plurality of rotors respond to the generated force input data thereby altering a dynamic position of the vehicle, and wherein the airflow sensor module is connected to a three-dimensional air flow sensor, the three-dimensional air flow sensor comprising:
a conical sensor tip with a central orifice and a plurality of equally spaced circumferential orifices.

2. The control system of claim 1, wherein the force allocation module generated force input data for a plurality of control surfaces disposed on the vehicle such that the control input data for the plurality of control surfaces configures the position of each of the plurality of control surfaces to maintain an equilibrium state of the vehicle.

3. The control system of claim 1, wherein the vehicle is a VTOL.

4. The control system of claim 1, wherein the vehicle is a fixed-wing VTOL.

5. The aircraft vehicle control system of claim 1, wherein the three-dimensional airflow sensor has four circumferential orifices.

6. The aircraft vehicle control system of claim 1, wherein the three-dimensional airflow sensor is positioned directly in a flight path of the vehicle.

7. A method for controlling a vehicle comprising:
utilizing a control system to activate at least a plurality of thrust rotors disposed on an aircraft vehicle and configured to generate a propulsion of the vehicle in a first direction;
adjusting the position and thrust from at least one of the thrust rotors to propel the vehicle in a second direction;
measuring a set of dynamic forces on the aircraft vehicle and determining a desired attitude of the aircraft vehicle through a force allocation module;
determining a change in force required for each of the plurality of thrust rotors in order to maintain an equilibrium state of the aircraft vehicle; and
allocating a new force component to each of the plurality of thrust rotors based on the determined force in order to maintain the equilibrium state of the vehicle,
wherein measuring the set of dynamic forces further comprises receiving velocity input data from a three-dimensional airflow sensor, and
wherein the three-dimensional airflow sensor has a conical tip with at least a central orifice and the airflow sensor has a plurality of circumferential orifices such that each of the orifices can be used to determine a pressure differential across a pressure sensor and generate an incident velocity data set.

8. The method of claim 7, wherein the control system is further configured to activate a plurality of control surfaces disposed on the aircraft vehicle wherein the activation of the control surfaces can be used to adjust the dynamic forces on the aircraft vehicle.

9. The method of claim 8, further comprising utilizing the plurality of control surfaces to help move and maintain the vehicle in the second direction.

10. The method of claim 8, further comprising determining the change in force required for each of the plurality of control surfaces in conjunction with the change in force required for each of the plurality of thrust rotors; and allocating a new force component for each of the plurality of control surfaces based on the determined force for both the thrust rotors and the control surfaces in order to maintain the equilibrium state of the aircraft vehicle.

11. The method of claim 7, wherein at least one of the plurality of thrust rotors is a horizontal thrust rotor.

12. The method of claim 7, wherein more than one of the thrust rotors is a vertical thrust rotor.

13. The method of claim 7, wherein the three-dimensional airflow sensor has four circumferential orifices.

14. The method of claim 7, wherein the three-dimensional airflow sensor has four equally spaced circumferential orifices.

15. The method of claim 7, wherein the three-dimensional airflow sensor has four equally spaced circumferential orifices.

16. An aircraft vehicle comprising:
a body portion;
a plurality of thrust rotors configured to generate thrust to propel the vehicle in a first direction;
a control module disposed within the vehicle and configured to distribute power to each of the plurality of thrust vectors; and
an airflow sensor connected to a portion of the vehicle, wherein the airflow sensor is disposed in a location that is positioned directly in a flight path of the aircraft vehicle, and wherein the airflow sensor comprises:
a conical sensor tip with a central orifice and a plurality of equally spaced circumferential orifices.

17. The vehicle of claim 16 further comprising a wing portion fixed to the body portion and wherein the wing portion has a plurality of control surfaces that can be manipulated or moved in a number of different directions such that the movement of the respective control surfaces can affect a relative position and attitude of the aircraft vehicle and wherein the control module is configured to distribute control commands to each of the control surfaces based on a calculated position and attitude of the vehicle such that the vehicle maintains an equilibrium state.

18. The vehicle of claim 17 wherein the control module is configured to receive incident velocity airflow data from the airflow sensor and utilize the incident velocity airflow data to allocate a new power function to each of the plurality of thrust vectors and each of the control surfaces in order to maintain the equilibrium state of the vehicle.

19. The aircraft vehicle of claim 16, wherein the conical sensor tip has four circumferential orifices.

20. The aircraft vehicle of claim 16, wherein the airflow sensor is positioned such that the central orifice is positioned directly in line with the flight path of the aircraft vehicle.

* * * * *